Patented Mar. 24, 1931

1,797,877

UNITED STATES PATENT OFFICE

WILLIAM MOORE, OF CHAPPAQUA, NEW YORK, ASSIGNOR TO AMERICAN CYANAMID COMPANY, OF NEW YORK, N. Y., A CORPORATION OF MAINE

INSECTICIDE

No Drawing.  Application filed August 3, 1928. Serial No. 297,372.

This invention relates to an insecticide, particularly of the type suitable for destroying plant lice and other sucking insects.

The insecticide most used as a contact material for plant lice and other sucking insects is nicotine in solutions of various strengths. This substance, while efficacious under certain conditions has drawbacks which make it desirable to use other materials, not having the disadvantages of nicotine.

It is one of the objects of the present invention to obtain an insecticide having the desirable properties of nicotine, without being subject to the disadvantages of this latter material. It is a further object to obtain an insecticide which is cheaper than nicotine and with which it is possible to obtain a good kill, using high dilutions whereas similar dilutions of nicotine would not be effective. It is a still further object to obtain an insecticide which retains its killing power at low temperatures in contrast to nicotine which loses toxicity as the temperature at which it is used is lowered. Other objects will be apparent from the description and claims.

The above objects are attained by using as an insecticide the product of reaction between a tertiary amine, and a halogen derivative of an unsaturated hydrocarbon. These products are quaternary ammonium compounds in which the nitrogen is pentavalent.

The following example illustrates one's specific method of preparing an insecticide in accordance with the invention which, however, is not limited thereto.

Trimethyl chlor-ethyl ammonium chloride is prepared by heating a mixture of 45 parts trimethylamine solution (29% in alcohol) with 30 parts ethylene chloride (30% excess). This mixture is heated under pressure in a closed container at a temperature of 60°–75° C. for 22 hours. The alcohol is then evaporated off and the product washed with acetone and dried. The dried product remaining is only slightly discolored and yields of about 71% based on the trimethylamine, are obtained.

The reaction probably takes place in accordance with the following equation:

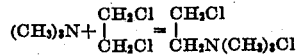

Comparative tests were made with this material and nicotine (Black Leaf 40) soap solution (1–400) being used as a spreader. Sprayed on dwarf nasturtiums, containing aphis rumicis, the following results were obtained, the percentage kill being given for the various dilutions:

| Dilution | Percent kill | |
|---|---|---|
| | Black Leaf 40 | Trimethyl chlorethyl ammonium chloride |
| 1–3200 | 98.0 | 96.0 |
| 1–6400 | 90.6 | 89.9 |
| 1–12800 | 35.0 | 87.0 |
| 1–25600 | None | 85.7 |

In place of the trimethylamine, there may be used other tertiary amines such as, for instance, tripropylamine, tributylamine, triamylamine, pyridine, etc. For the ethylene chloride, it is possible to substitute other halogen derivatives of unsaturated hydrocarbons such as, for instance, butylenedichloride, amylenedichloride, the bromides, etc.

It will be noted that the reactions above described give an insecticide containing halogen radicals. If desired, one of these halogens may be substituted by other groupings, such as tertiary, secondary or primary amines, a cyanogen group, etc., or the halogen may be eliminated by rearrangement of the molecular structure.

Specifically, trimethyl chlor-ethyl ammonium chloride may be converted to trimethyl vinyl ammonium chloride by heating at 80°–90° C. for about one-half hour, a mixture of 400 grams trimethyl chlorethyl ammonium chloride with 10 liters of N/2 sodium hydroxide. The solution may then be neutralized with hydrochloric acid and the trimethyl vinyl ammonium chloride may be chrystallized out.

The reaction which takes place is probably as follows:

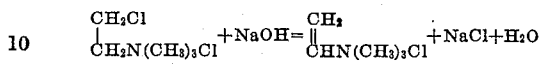

It is understood that any suitable method may be used for preparing the desired insecticides in accordance with usual chemical procedure since the invention is not limited to those methods described. Any desired combination of tertiary amine and unsaturated hydrocarbon halide may be used in making up the insecticides and when desired various mixtures of two or more of each of these substances may be employed.

In using the insecticides described, it is merely necessary to dissolve and apply them in the usual manner, spraying being most often the method selected. As a spreader to assist in wetting the insects, there may be used solutions of various vegetable or animal soaps, cresylic acid, casein, glue, saponin, etc., depending upon the nature of the insects and the kind of plant or the like upon which the insects are found.

Any suitable variations or changes may be made without departing from the spirit of the invention except as defined in the appended claims.

I claim:

1. An insecticide comprising the product of reaction between a tertiary amine and a halogen derivative of an unsaturated hydrocarbon.

2. An insecticide comprising a quaternary ammonium compound having most probably the formula:

in which R represents alkyl radicals, R' represents an unsaturated hydrocarbon radical and X represents a halogen radical.

3. The insecticide of claim 2 in which R represents methyl groups.

4. The insecticide of claim 2 in which R represents methyl groups and R' represents an ethyl group.

5. An insecticide comprising trimethyl chlorethyl ammonium chloride.

In testimony whereof, I have hereunto subscribed my name this 1st day of August, 1928.

WILLIAM MOORE.